(12) United States Patent
Choi et al.

(10) Patent No.: US 9,148,825 B2
(45) Date of Patent: Sep. 29, 2015

(54) SYSTEM AND METHOD OF PERFORMING IDLE MODE SIGNALING REDUCTION IN MULTI-RADIO ACCESS TECHNOLOGY CELLULAR NETWORKS

(71) Applicant: Marvell World Trade Ltd., St. Michael (BB)

(72) Inventors: Jihwan P. Choi, Daegu (KR); Jiwon S. Han, San Ramon, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 134 days.

(21) Appl. No.: 13/852,244

(22) Filed: Mar. 28, 2013

(65) Prior Publication Data
US 2013/0267234 A1 Oct. 10, 2013

Related U.S. Application Data (60) Provisional application No. 61/791,912, filed on Mar. 15, 2013, provisional application No. 61/621,313, filed on Apr. 6, 2012.

(51) Int. Cl.
*H04W 36/00* (2009.01)
*H04W 48/18* (2009.01)
*H04W 60/04* (2009.01)

(52) U.S. Cl.
CPC .......... *H04W 36/0005* (2013.01); *H04W 48/18* (2013.01); *H04W 60/04* (2013.01)

(58) Field of Classification Search
CPC ...... H04L 69/28; H04W 68/02; H04W 36/30; H04W 36/18; H04W 36/08; H04W 36/14; H04W 36/12
See application file for complete search history.

(56) References Cited

U.S. PATENT DOCUMENTS

2005/0180438 A1* 8/2005 Ko et al. ............... 370/401
2009/0176513 A1* 7/2009 Bosch et al. .......... 455/458
(Continued)

FOREIGN PATENT DOCUMENTS

| EP | 2 154 859 | 2/2010 |
| EP | 2 214 444 | 8/2010 |
| WO | WO/2012/021359 | 2/2012 |

OTHER PUBLICATIONS

3rd Generation Partnership Project;Technical Specification Group Services and System Aspects;General Packet Radio Service (GPRS) enhancements for Evolved Universal Terrestrial Radio Access Network;3GPP TS 23.401 V11.1.0 (Mar. 2013).
(Continued)

*Primary Examiner* — Nathan Mitchell
*Assistant Examiner* — Shantell L Heiber (57) ABSTRACT

A method includes performing a handover for a mobile device between first and second RAT networks. The first RAT network has a tracking area. The second RAT network has a routing area. Idle mode signaling reduction is activated in the mobile device including activating first and second timers respectively for the first and second RAT networks. In response to either one of the first and second timers expiring, a tracking or routing area update is sent to a first base station. The first base station is in the first RAT network or the second RAT network. The first timer is reset while the second timer maintains a set offset from the first timer. The tracking area update indicates that the mobile device has performed a handover to the first RAT network. The routing area update indicates that the mobile device has handed over to the second RAT network.

30 Claims, 5 Drawing Sheets

(56) References Cited

U.S. PATENT DOCUMENTS

2010/0124223 A1      5/2010  Gibbs et al.
2011/0021158 A1*     1/2011  Xing et al. .................. 455/68
2013/0308527 A1*    11/2013  Chin et al. .................. 370/328

OTHER PUBLICATIONS

3rd Generation Partnership Project;Technical Specification Group Radio Access Network; Evolved Universal Terrestrial Radio Access (E-UTRA);Radio Resource Control (RRC); Protocol specification (Release 10);3GPP TS 36.331 V10.5.0 (Mar. 2013).

3rd Generation Partnership Project;Technical Specification Group Core Network and Terminals;Non-Access-Stratum (NAS) protocol for Evolved Packet System (EPS); Stage 3 (Release 11);3GPP TS 24.301 V11.1.0 (Dec. 2011).

PCT International Search Report and Written Opionion; Jul. 22, 2013.

* cited by examiner

SYSTEM AND METHOD OF PERFORMING IDLE MODE SIGNALING REDUCTION IN MULTI-RADIO ACCESS TECHNOLOGY CELLULAR NETWORKS

CROSS-REFERENCE TO RELATED APPLICATIONS

This application claims the benefit of U.S. Provisional Application No. 61/621,313 filed on Apr. 6, 2012 and U.S. Provisional Application No. 61/791,912 filed on Mar. 15, 2013. The entire disclosures of the applications referenced above are incorporated herein by reference.

FIELD

The present disclosure relates to multi-radio access technology (RAT) cellular networks, and more particularly to idle mode signaling reduction (ISR) in multi-RAT cellular networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A multi-RAT cellular network refers to a cellular network in which one or more radio access technologies are used for signals between mobile devices and base stations. A mobile device can move between coverage areas deploying respective RATs. Each coverage area has an associated cell. A cell can have one or more assigned carrier frequencies on which signals are transmitted between the mobile device and base stations in the corresponding coverage area of that cell.

As an example, cellular networks can deploy RATs such as second generation (2G), third generation (3G), and/or fourth generation (4G) long term evolution (LTE) wireless communication technologies. Third generation partnership project (3GPP) networks can deploy, for example, (i) universal mobile telecommunication system (UMTS) terrestrial radio access (UTRAN) for 2G and 3G communication between a mobile device and a base station, and (ii) evolved UTRAN (EUTRAN) for 4 G communication between a mobile device and a base station.

A mobile device (also referred to as a user equipment or UE) can be equipped with multi-RAT transmit and receive capabilities. The mobile device can move across cells having different deployed RATs. The mobile device can communicate with (i) a first base station in a first cell using a first RAT, and (ii) a second base station in a second cell using a second RAT. Since the mobile device is moving between cells in which different RATs are deployed, an inter-RAT handover is performed from the first base station to the second base station.

During inter-RAT handover, selection of a new or different cell (referred to as cell reselection) can be controlled by (i) the base stations via a "backbone" network when the mobile device is operating in a connected mode, or (ii) the mobile device when the mobile device is operating in an idle mode. The base stations can communicate with each other via the backbone network. While in the idle mode, the mobile device can perform cell reselection if conditions of one or more channels of a current cell deteriorate. A channel can be considered as deteriorated when one or more conditions exist, for example, when one or more parameters are outside predetermined ranges. The parameters can include signal-to-noise ratio (SNR), bit error rate (BER), number of errors, signal quality, etc. A handover and cell reselection can be performed to allow a mobile device to receive system information blocks (SIBs), perform random access procedures to connect to a base station, and receive paging messages from a base station. SIBs can be in system information messages periodically transmitted from base stations to mobile devices.

SUMMARY

A method is provided and includes performing a handover for a mobile device between a first radio access technology network and a second radio access technology network. The first radio access technology network has a tracking area. The second radio access technology network has a routing area. Idle mode signaling reduction is activated in the mobile device including activating (i) a first timer for the first radio access technology network, and (ii) a second timer for the second radio access technology network. In response to either one of the first timer and the second timer expiring, a tracking area update or a routing area update is sent to a first base station. The first base station is in the first radio access technology network or the second radio access technology network. The first timer is reset while the second timer maintains a set offset from the first timer. The tracking area update indicates that the mobile device has performed a handover to the first radio access technology network. The routing area update indicates that the mobile device has performed a handover to the second radio access technology network.

In other features, a method is provided and includes receiving, at a first base station, a signal from a mobile device. The signal indicates that the mobile device is performing a first handover between (i) a first radio access technology network having a tracking area, and (ii) a second radio access technology network having a routing area. Responsive to the signal from the mobile device indicating that the mobile device is performing the first handover, idle mode signaling reduction is activated at the first base station, and a signal is transmitted to the mobile device indicating activation of idle mode signaling reduction. The method further includes, during the idle mode signaling reduction: transmitting from the first base station to the mobile device, (i) a first update period for the first radio access technology network, and (ii) a second update period for the second radio access technology network; and receiving from the mobile device at the first base station, a tracking area update or a routing area update when either one of a first timer and a second timer have expired. The first timer expires based on the first update period. The second timer expires based on the second update period.

In other features, a method is provided and includes performing a handover for a mobile device between a first radio access technology network and a second radio access technology network. The first radio access technology network and the second radio access technology network are in a predetermined coverage area. Idle mode signaling reduction in the mobile device is activated and includes activating a timer to be used for both of the first radio access technology network and the second radio access technology network. In response to the timer expiring, a first area update for the predetermined coverage area is sent to (i) a first base station in the first radio access technology network, or (ii) a second base station in the second radio access technology network. The first area update indicates the mobile device has performed a handover between the first radio access technology network and the second radio access technology network.

In other features, a method is provided and includes receiving a signal from a mobile device at a base station. The signal indicates that the mobile device is performing a first handover between (i) a first radio access technology network, and (ii) a second radio access technology network. The first radio access technology network and the second radio access technology network are in a predetermined coverage area. Idle mode signaling reduction is activated at the base station. A signal is transmitted to the mobile device indicating activation of idle mode signaling reduction. The method further includes transmitting from the base station to the mobile device an update period to be used for both the first radio access technology network and the second radio access technology network. An area update is received from the mobile device when a timer has expired. The timer expires based on the update period.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
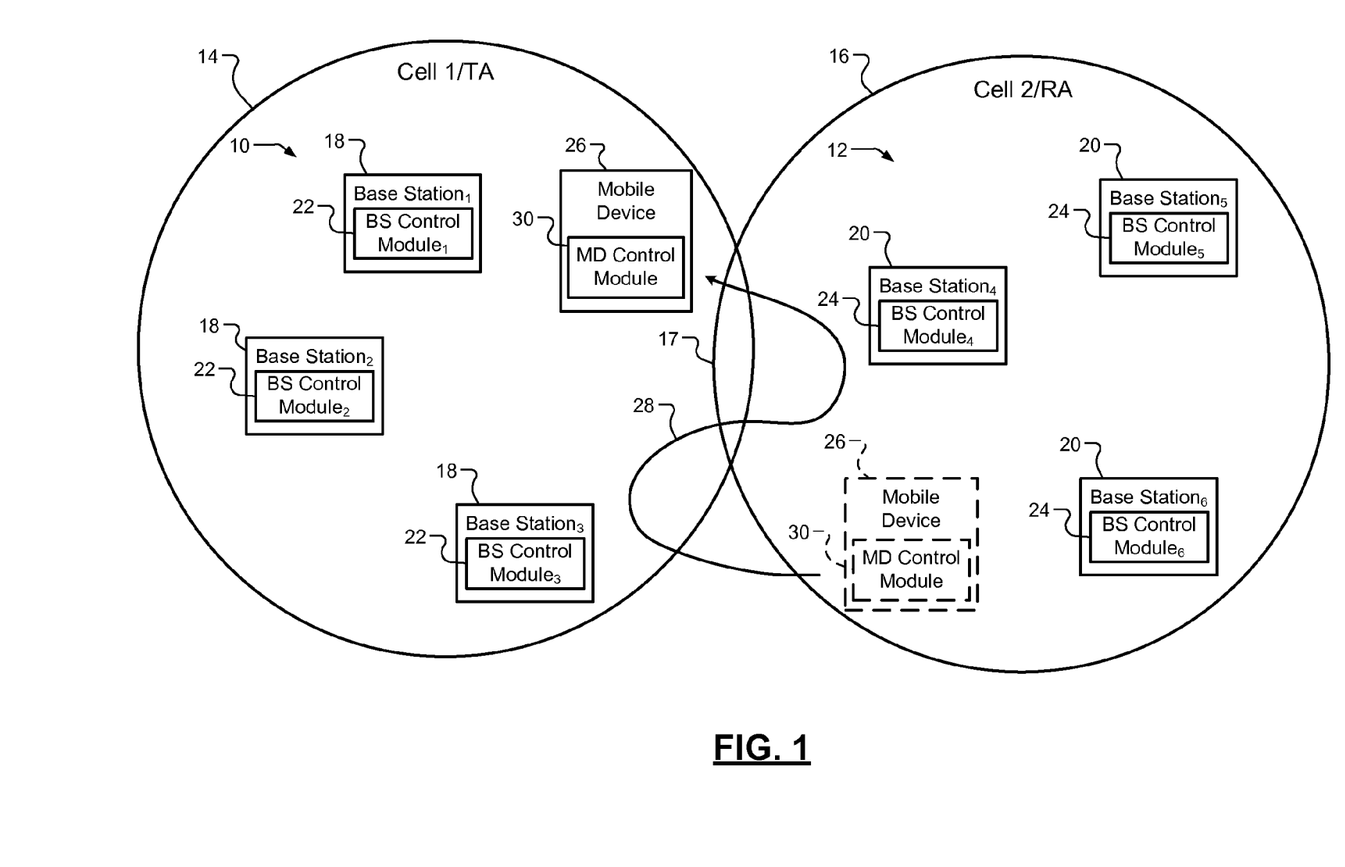
FIG. 1 is a functional block diagram of multiple radio access technology networks in accordance with one embodiment of the present disclosure.

FIG. 1 shows multiple RAT cellular networks 10, 12. The multi-RAT cellular networks 10, 12 include respective coverage areas 14, 16 in which mobile devices and base stations communicate with each other. Each of the coverage areas is referred to as a track area (TA) or a routing area (RA). The mobile devices and base stations may communicate with each other using 4G LTE communication protocols while in a TA. The mobile devices and base stations may communicate with each other using 3G and/or 2 G communication protocols while in a RA. 2 G communication protocols may refer to or include global system for mobile (GSM) communication protocols and 3 G communication protocols may refer to or include code division multiple access (CDMA) communication protocols. Each of the coverage areas may have an associated set of base stations. The base stations of a coverage area send a same type of paging messages (e.g., 4G, 3G, and/or 2G paging messages) to mobile devices within that coverage area. A base station may send paging messages to a mobile device, for example, when the base station has data for the mobile device.

The coverage areas 14, 16 may overlap to provide an overlap area 17. One or more base stations may be located in the overlap area 17. A mobile device may move between the coverage areas 14, 16. As an example, the mobile device 26 is shown as moving from a RA to a TA, from the TA to the RA through the overlap area 17, and from the RA back to the TA. The mobile device 26 may move between the RA and the TA multiple times. This movement can cause the mobile device 26 to transmit a tracking area update (TAU) and/or a routing area update (RAU) numerous times.

For example, while in an idle mode, the mobile device 26 may send a TAU or a RAU to a base station to receive paging messages from the base station. The TAU or RAU notifies the base station of an updated TA or RA in which the mobile device 26 is located and/or of one or more corresponding RATs that the mobile device 26 is using. The TAU and/or RAU may be an event-triggered TAU and/or RAU as described or may be sent periodically based on respective timers.

An event-triggered TAU and/or RAU may be sent from the mobile device 26 to a base station, for example, when the mobile device 26 moves from a first coverage area to a second coverage area and switches RATs. As another example, an event-triggered TAU and/or RAU may be sent when the mobile device 26 switches, due to cell deterioration, from (i) a first set of one or more cells of a first coverage area to (ii) a second set of one or more cells of another coverage area.

The mobile device 26 may send a TAU and/or RAU when a predetermined period expires. The length of the predetermined period may depend on a pre-configuration between the mobile device 26 and a base station. The pre-configuration may include (i) synchronizing clocks of the mobile device 26 and the base station, and/or (ii) transmitting update periods for the TAU and/or RAU from the base station to the mobile device 26. The mobile device 26 may then periodically send the TAUs and RAUs based on the respective update periods.

Event-triggered TAU and RAU transmissions can become excessive when the mobile device is at boundaries of the coverage areas and repeatedly switches between cells. In order to reduce the number of TAU and RAU transmissions, idle mode signaling reduction (ISR) may be performed. As an example, a mobile device, for a first inter-RAT handover from a first base station of a first coverage area to a second base station of a second coverage area, sends a TAU or a RAU to the second base station. The first coverage area may have a first cell and exhibit 3G or 2G communication. The second coverage area may have a second cell and exhibit 4G LTE communication. The second base station may activate ISR and then inform the first base station and/or a backbone network of the first inter-RAT handover.

The base stations can communicate with each other and share information regarding the mobile device 26 via the backbone network. The second base station transmits a notification signal to the mobile device 26 indicating that ISR is enabled. The mobile device 26 may then be registered in both of the coverage areas. Because of this, the mobile device 26 does not need to send an event-triggered TAU or RAU when moving between the first coverage area and the second coverage area. While performing ISR, the mobile device 26 may not send a TAU or RAU when the mobile devices perform an inter-RAT handover between a base station in the first coverage area and a base station in the second coverage area. A TAU or a RAU may be sent if the mobile device 26 switches to a base station that is not in the first coverage area or the second coverage area. In other words, if the mobile device 26 moves to and switches to a third coverage area that the mobile device 26 was not previously registered in, then a TAU or RAU is sent. The third coverage area is a TA and/or RA that is different than the first coverage area and the second coverage area.

The mobile device 26 may send a TAU or a RAU periodically. The mobile device 26, base stations of the first coverage area and the second coverage area, and/or the backbone network may each maintain two update timers. A first update timer of each network device may indicate when the mobile device 26 is to transmit a TAU and may be iteratively reset for subsequent TAUs. A second update timer of each network device may indicate when the mobile device 26 is to transmit a RAU and may be iteratively reset for subsequent RAUs. The update timers of the mobile device 26, the base stations and the backbone network for the first coverage area may be synchronized. The update timers of the mobile device 26, the base stations and the backbone network for the second coverage area may be synchronized. While performing ISR, base stations send a paging message for the mobile device 26 over the first coverage area and the second coverage area and in associated networks of the first coverage area and the second coverage area.

The following implementations further reduce the number of signals transmitted during an idle mode including reduction in the number of area updates transmitted. The area updates may include TAUs, RAUs, and super area updates (SAUs). As further described below, a SA (or predetermined area) may include one or more TAs and one or more RAs. The techniques include efficient scheduling of periodic area updates between a mobile device and base stations of multiple RAT cellular networks.

FIG. 1 shows multiple RAT cellular networks 10, 12. The first RAT cellular network 10 is within a first cell and has a corresponding first coverage area 14 referred to as a tracking area (TA). The second RAT cellular network 12 is within a second cell and has a corresponding second coverage area 16 referred to as a routing area (RA). Each of the first cell and the second cell may refer to a respective geographical coverage area and/or range over which signals are transmitted between network devices (e.g., mobile devices and base stations) on one or more assigned carriers. Each carrier may refer to one or more frequencies and/or a range of frequencies. The first cell and the second cell can be distinct or can overlap in area and/or range.

Network devices located in a cell transmit and receive signals on one or more carriers allocated to that cell. The network devices may be configured to communicate on carriers of one or more of the cells. Network devices that are in the TA may communicate using a first RAT (e.g., 4G LTE). Network devices that are in the RA may communicate using a second RAT (e.g., 2G and/or 3G).

In the example shown, first base stations 18 are in the first cell and/or TA 14 and second base stations 20 are in the second cell and/or RA 16. The base stations 18, 20 have respective control modules 22, 24. A mobile device 26 may be near boundaries of the TA 14 and RA 16 and move between the TA 14 and the RA 16, as shown by arrow 28. The mobile device 26 may include a control module 30, which may communicate with the control modules 22, 24 of the base stations 18, 20. Movement between the TA 14 and the RA 16 may trigger the mobile device 26 to transmit a TAU or a RAU. This may depend upon the whether the mobile device 26 is performing a handover to the first RAT cellular network 10 or is performing a handover to the second RAT cellular network 12.

A TAU refers to a message sent from the mobile device 26 to a first base station. The first base station is in the first RAT cellular network 10 and the TA 14. The TAU informs the first base station that the mobile device 26 is performing handover to the first RAT cellular network 10. A RAU refers to a message sent from the mobile device 26 to a second base station. The second base station is in the second RAT cellular network 12 and the RA 16. The RAU informs the second base station that the mobile device 26 is performing a handover to the first RAT cellular network 10.

The mobile device 26 may not move between the TA 14 and RA 16 and/or perform a handover between the multi-RAT cellular networks 10, 12 that often. To periodically update base stations in each of the multi-RAT cellular networks 10, 12 of a "camp-on" cell of the mobile device 26, the mobile device 26 may send TAUs and/or RAUs periodically to at least one of the base stations. A camp-on cell may refer to a cell that: the mobile device 26 has selected; the mobile device 26 is registered in; and has a carrier assigned to the mobile device 26 on which the mobile device 26 is communicating with a base station. A camp-on cell may also refer to a particular coverage area, if the coverage area has a single associated cell. TAUs are transmitted to base stations in the TA 14. RAUs are transmitted to base stations in the RA 16. The TAUs and RAUs may be periodically sent to maintain, for example, registration of the mobile device 26 in each of the multi-RAT cellular networks 10, 12.

The base stations 18, 20 may communicate with each other via a "backbone" network. The base stations 18, 20 may share information regarding the mobile device 26 with each other including, for example, identifiers (IDs) of the mobile device 26, update periods, locations of the mobile device 26, whether the mobile device 26 is in the TA 14 or RA 16, carriers allocated to the mobile device 26, etc. The update periods may refer to periods between TAUs and/or periods between RAUs. The update periods may be set by one or more of the base stations 18, and sent to the mobile device 26, as further described below.

The base stations 18, 20 and the mobile device 26 may operate based on and/or satisfy various (i) 3GPP standards, such as 3GPP TS 23.401 standards, 3GPP TS 24.301 standards, and 3GPP TS 36.331 standards, and (ii) IEEE standards, such as IEEE 802.11-2012 standards, IEEE 802.16-2009 standards, and IEEE 802.20-2008 standards.

Figure 2:
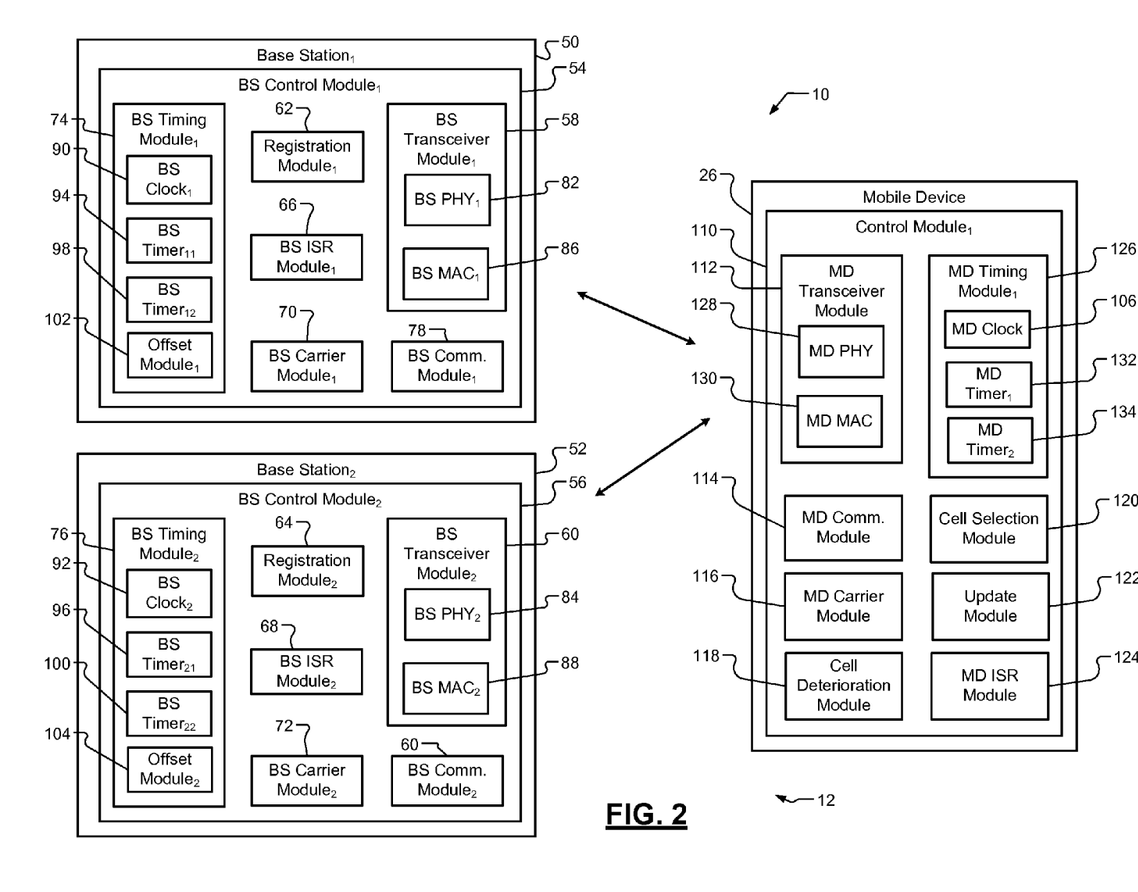
FIG. 2 is a functional block diagram of a mobile device and base stations in the radio access technology networks and in accordance with one embodiment of the present disclosure.

Referring also to FIG. 2, which shows the mobile device 26 and base stations 50, 52 in the multi-RAT cellular networks 10, 12. As an example, the first base station 50 may be one of the base stations 18 in the TA 14. The second base station 52 may be one of the base stations 20 in the RA 16. The first base station 50 is in the first RAT cellular network 10. The second base station 52 is in the second RAT cellular network 12. The mobile device 26 may be referred to as user equipment (UE) and move between the TA 14 and RA 16 of the multi-RAT cellular networks 10, 12 and as a result perform handovers between the multi-RAT cellular networks 10, 12.

The base stations 50, 52 include respective BS control modules 54, 56. The BS control modules 54, 56 include respective base station (BS) transceiver modules 58, 60, registration modules 62, 64, BS idle mode signaling reduction (ISR) modules 66, 68, BS carrier modules 70, 72, BS timing modules 74, 76 and communication modules 78, 80. The BS transceiver modules 58, 60 may include respective BS physical layer (PHY) modules 82, 84 and BS media access control (MAC) modules 86, 88. The PHY modules 82, 84 transmit signals to and receive signals from the mobile device 26. The MAC modules 86, 88 transfer signals between the BS PHY modules 82, 84 and other modules of the BS control modules 54, 56.

The registration modules 62, 64 register mobile devices and maintain a record of registered mobile devices. The registration modules 62, 64 may establish connections between the mobile devices and the base stations 50, 52. The registration modules 62, 64 may share information of the mobile devices, such as IDs of the mobile devices, camp-on cells of the mobile devices, update periods, location of the mobile devices, whether the mobile devices are in the TA 14 or RA 16, carriers allocated to the mobile devices, etc.

The BS ISR modules 66, 68 activate and execute ISR. The BS ISR modules 66, 68 may transmit ISR messages to the mobile device 26 to indicate to the mobile device 26 that ISR is activated. The BS ISR modules 66, 68 may activate ISR, for example, when a mobile device 26 performs a first handover between the multi-RAT cellular networks 10, 12. The BS ISR modules 66, 68 and/or the BS timing modules 74, 76 may transmit, via the BS transceiver modules 58, 60, to the mobile device 26 update periods, such as update periods for timers associated with the TA 14, the RA 16, or a SA. The SA may refer to a coverage area that includes the TA 14 and the RA 16. As is further described below, each of the BSs 50, 52 and the mobile device 26 may include timers for the TA 14, the RA 16 and/or the SA. The timers may be set and/or expire based on corresponding update periods. The mobile device 26 may periodically transmit a TAU, a RAU and/or a SAU based on respective update periods. The SAU may be sent when the mobile device 26 is in the SA and indicates, for example, that the mobile device 26 is performing a handover between multi-RAT cellular networks in the SA.

The BS carrier modules 70, 72 may select one or more frequencies, frequency ranges and/or carriers for the mobile device 26. The BS carrier modules 70, 72 may send, via the BS transceiver modules 58, 60, messages to the mobile device 26 to inform the mobile device 26 which frequencies, frequency ranges and/or carriers to communicate on when in respective cells, coverage areas, and/or multi-RAT cellular networks.

The BS timing modules 74, 76 may include BS clocks 90, 92, first BS timers 94, 96, second BS timers 98, 100, and/or offset modules 102, 104. The BS clocks 90, 92 may be synchronized with each other and/or with a mobile device (MD) clock 106 of the mobile device 26. Synchronization with the MD clock 106 may occur during a handover, while the MD 26 is establishing a connection with the BSs 50, 52, and/or during registration of the MD 26 with the BSs 50, 52. The first BS timers 94, 96 may be used for update periods of the TA or SA and indicate when the MD 26 is to send a TAU or a SAU. The second BS timers 98, 100 may be used for RA update periods and to indicate when the MD 26 is to send a RAU. The BS timing modules 74, 76 may determine update periods associated with the MD 26 sending TAUs, RAUs and SAUs and set, activate (or start), and/or reset the BS timers 94-100 based on corresponding ones of the update periods.

The communication modules 78, 80, via the BS transceiver modules 58, 60, transmit signals to and receive signals from the MD 26. The transmitted and received signals may include user data and/or control information. The control information may include (i) timing signals, such as synchronization signals and update periods, (ii) information identifying allocated frequencies, carriers, and bandwidth, (iii) packet information (e.g., packet format and size), (iv) transmit and/or receive port information (e.g., port IDs), TAUs, RAUs or SAUs, etc.

The MD 26 includes a MD control module 110, which includes a MD transceiver module 112, a MD communication module 114, a carrier module 116, a cell deterioration module 118, a cell selection module 120, an update module 122, a MD ISR module 124, and a MD timing module 126. The MD transceiver module 112 includes a MD PHY module 128 and a MD MAC module 130. The MD PHY module 128 transmits signals to and receives signals from the BSs 50, 52. The MD MAC module 130 transfers signals between the MD PHY module 128 and other modules of the MD 26. The MD communication module 114 communicates with the BSs 50, 52 via the MD transceiver module 112. The MD communication module 114 may transmit signals to and receive signals from the BSs 50, 52 including signals having user data and/or control information, such as the control information stated above.

The MD carrier module 116 determines on which carriers the BSs 50, 52 are transmitting, for example, paging signals and/or other signals. The MD carrier module 116 may also determine on which carriers the MD 26 is to communicate with the BSs 50, 52. This may be based on messages received from the BS carrier modules 70, 72. The MD carrier module 116 may also be used to detect broadcast messages transmitted by the base stations 50, 52.

The cell deterioration module 118 determines whether carriers of a cell, on which the MD 26 is communicating, are deteriorating. A frequency and/or carrier may be considered as deteriorated when one or more conditions exist, for example, when one or more parameters are outside predetermined ranges. The parameters may include SNR, BER, number of errors, signal quality, etc. If a frequency and/or carrier is deemed to have deteriorated, the cell deterioration module 118 may initiate a handover. A handover may also be performed, for example, when the cell deterioration module 118 determines that signal quality between the MD 26 and a current BS is worse than signal quality with another BS. The BSs may be in the same or different cells and/or multi-RAT cellular networks. The handover may be (i) between BSs in a same cell and/or RAT cellular network, or (ii) between BSs in different cells and/or multi-RAT cellular networks.

A handover and cell reselection may be performed to allow the MD 26 to receive system information blocks (SIBs), perform random access procedures to connect to a base station, and receive paging messages from the base station. SIBs may be in system information messages periodically transmitted from base stations to mobile devices. The cell selection module 120 may be used, for example, to reselect a different cell do to cell deterioration and/or to switch to a different cell for improved signal quality.

The update module 122 may receive update periods from the BSs 50, 52 and/or transmit TAUs, RAUs and SAUs to the BSs 50, 52. The update module 122 and/or MD timing module 126 may set, activate and/or reset a first MD timer 132 and a second MD timer 134 based on the update periods.

The MD ISR module 124 determines whether ISR is active. The MD ISR module 124 may receive messages from the BS ISR modules 66, 68 indicating that ISR is active. The MD ISR module 124 may then activate ISR in the MD 26, which may include performing tasks of one or more of the methods of FIGS. 3-5. A MD 26 may be operating in an idle mode when ISR is inactive and/or active. During an idle mode, the MD 26 may not be communicating with a first BS, search for a cell to camp-on, and/or communicate with a second BS to perform a handover from the first BS to the second BS. During the idle mode, the MD 26 may find, select and switch to a cell.

The MD timing module 126 includes the MD clock 106 and the MD timers 132, 134. The MD clock 106 is synchronized with the BS clocks 90, 92. The MD timers 132, 134 may be synchronized with the BS timers 94-100. The first MD timer 132 may be used for update periods of the TA or SA and indicate when the MD 26 is to send a TAU or a SAU. The second MD timer 134 may be used for RA update periods and to indicate when the MD 26 is to send a RAU.

Mobile devices and base stations, such as the mobile device 26 and base stations 18, 20, 50, 52 of FIGS. 1 and 2 may perform ISR. ISR may be implemented using numerous methods. Example methods are illustrated in FIGS. 3-5.

Figure 3:
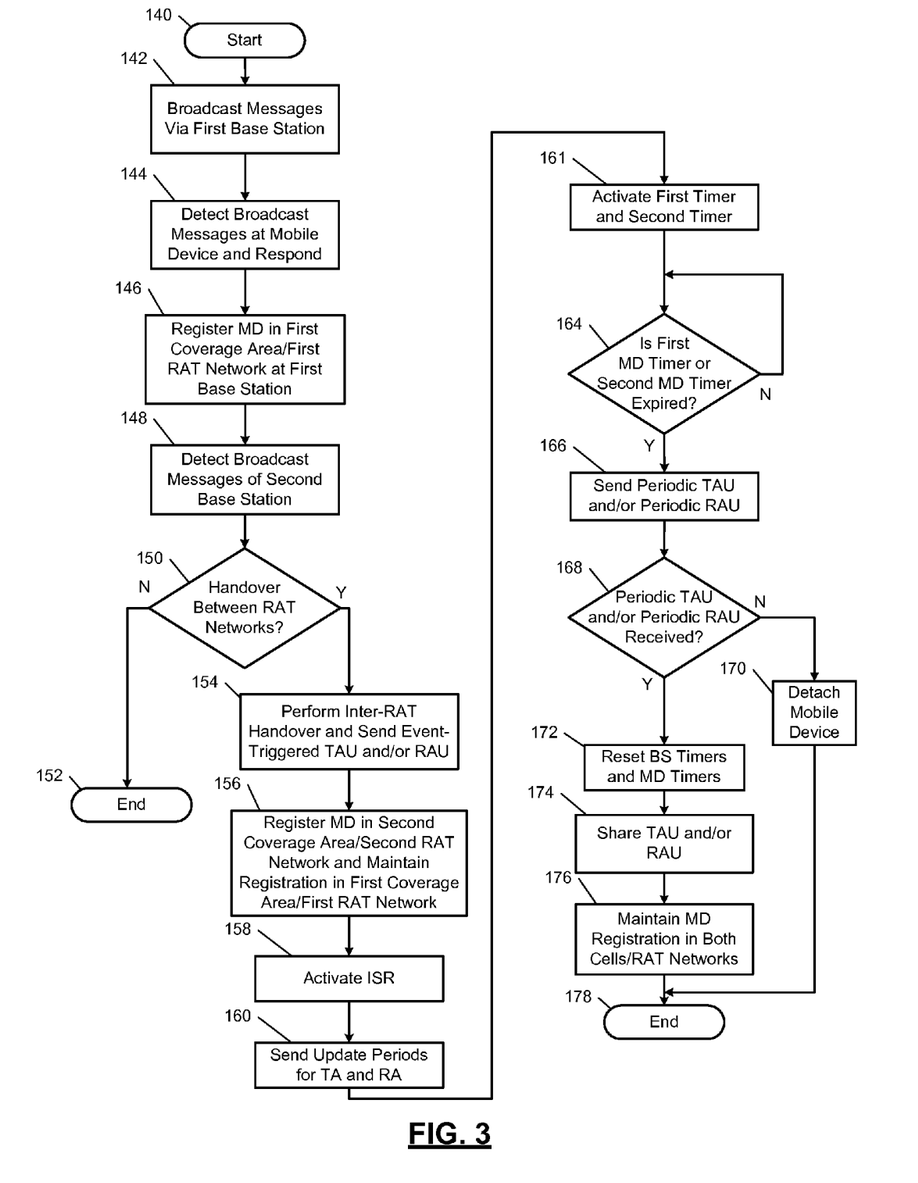
FIG. 3 illustrates a method of performing idle mode signaling reduction with non-offset timers in accordance with one embodiment of the present disclosure.
Figure 4:
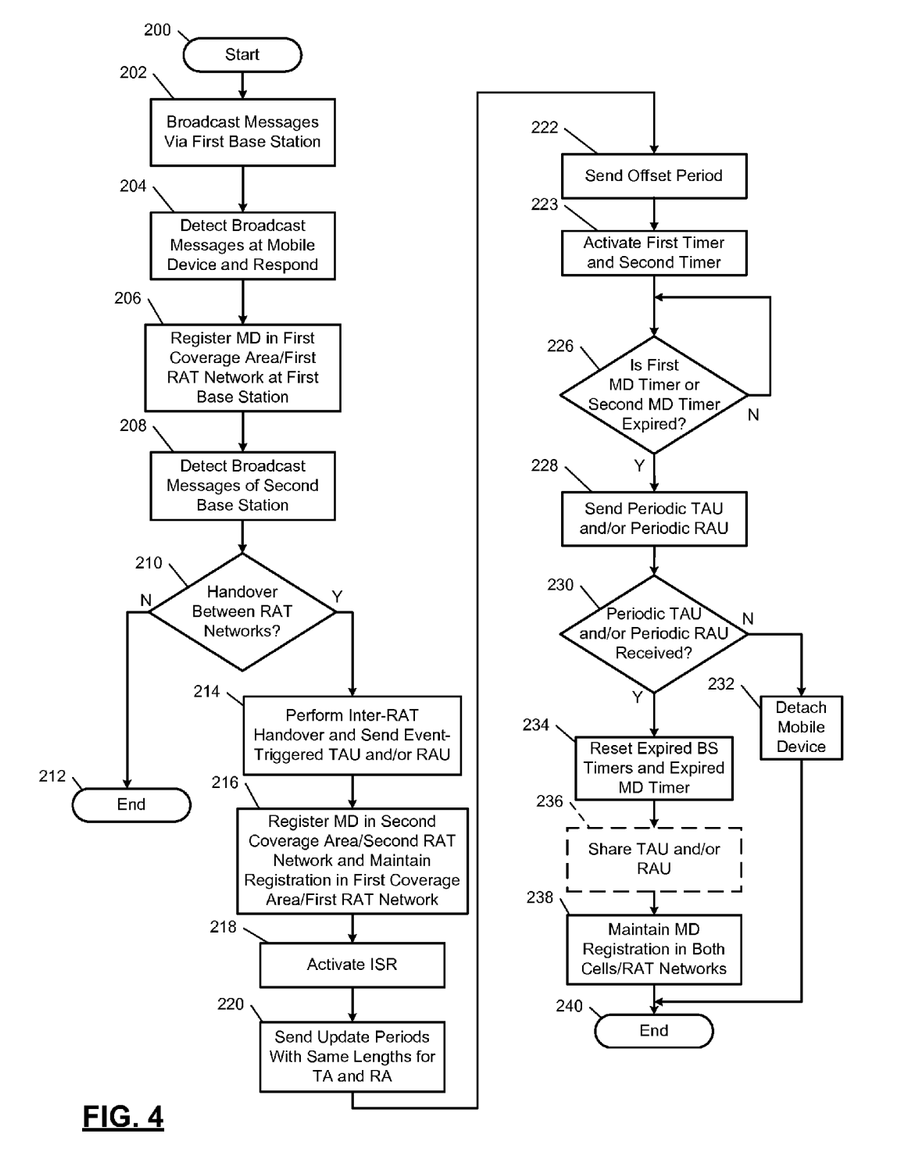
FIG. 4 illustrates a method of performing idle mode signaling reduction with offset timers in accordance with one embodiment of the present disclosure.
Figure 5:
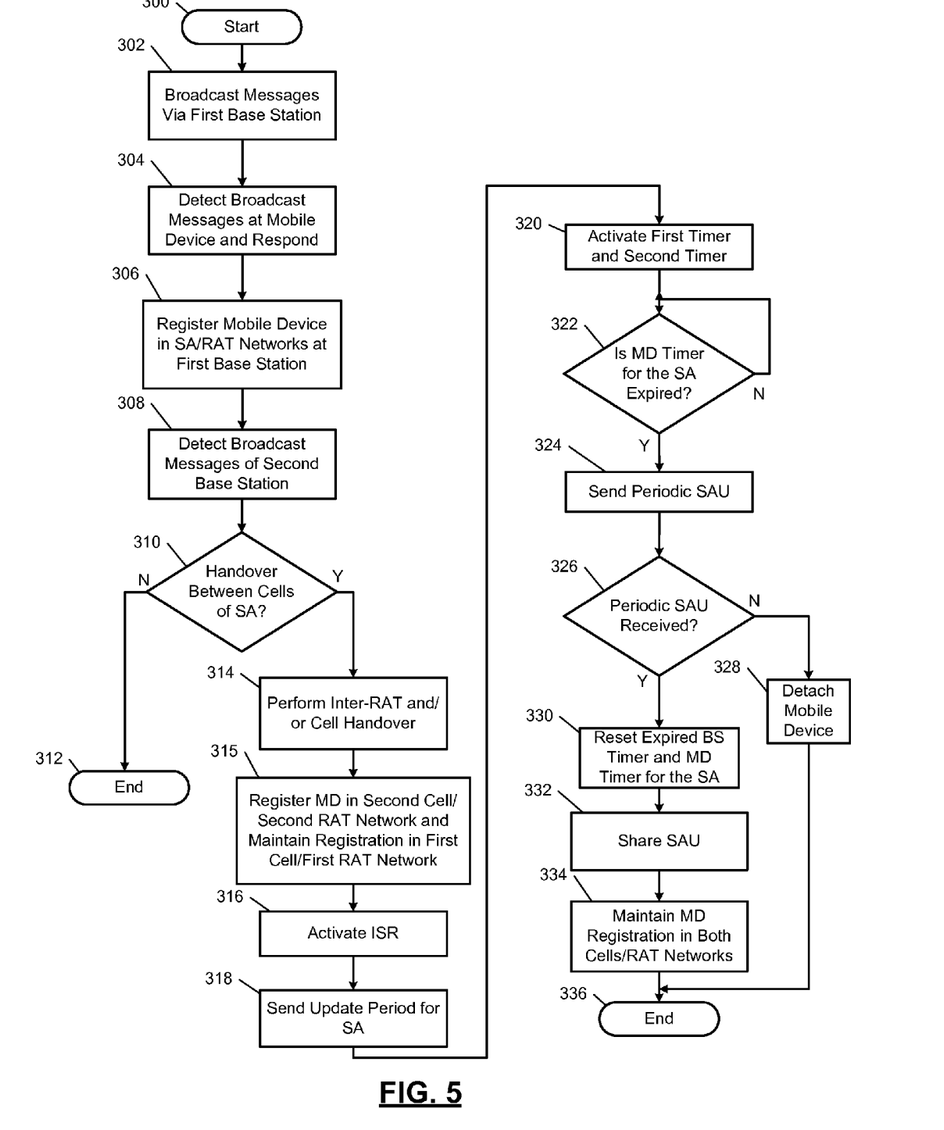
FIG. 5 illustrates a method of performing idle mode signaling reduction for a single coverage area in accordance with one embodiment of the present disclosure.

The below-described tasks of FIGS. 3-5 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events. Furthermore, the tasks may be divided into multiple tasks and performed at different times relative to other ones of the tasks.

FIG. 3 shows a method of performing ISR with non-offset timers. Although the following tasks are primarily described with respect to the implementations of FIGS. 1-2, the tasks may be easily modified to apply to other implementations of the present disclosure. The tasks may be iteratively performed. The method may begin at 140.

At 142, a first BS may broadcast messages. The broadcast messages may be paging messages. At 144, a MD (e.g., the MD 26) monitors a carrier of the first BS and detects the broadcast messages and responds to the first BS. At 146, a registration module (e.g., the registration module 62) of the first BS registers the MD in a first coverage area, first cell and first RAT cellular network. The first coverage area may be a TA or a RA. The first RAT cellular network may be associated with 2G, 3G, and/or 4G LTE communication.

At 148, the MD detects broadcast messages of a second BS. The second BS may be in a second coverage area, a second cell, and a second RAT cellular network. The second coverage area may be a TA or a RA and may be different than the first coverage area. The second RAT cellular network may be associated with 2G, 3G, and/or 4G LTE communication and be different than the first RAT cellular network.

At 150, a cell deterioration module (e.g., the cell deterioration module 118) of the MD determines whether to perform a handover, as described above. The handover may be from the first coverage area, the first BS and the first RAT cellular network to the second coverage area, the second BS and the second RAT cellular network. If no handover is to be performed, the method may end at 152, otherwise task 154 may be performed. In one implementation, task 158 is performed instead of ending at 152. Task 158 may be performed subsequent to task 146.

At 154, the cell deterioration module and/or the MD control module may perform the handover and transmit an event-triggered TAU and/or RAU to the first BS and/or second BS. The handover may be referred to as an inter-RAT handover, as the handover is between different RAT cellular networks. The handover may be a first handover since the MD was initially registered in the first RAT cellular network. An event-triggered TAU and an event-triggered RAU refer to transmission of a TAU and RAU due to, for example, the MD performing a handover. If the MD is in the TA, the MD sends the TAU. If the MD is in the RA, the MD sends the RAU. If the MD is in the TA and the RA, the MD may send both a TAU and a RAU.

At 156, a registration module (e.g., the registration module 64) of the second BS registers the MD in the second coverage area and second RAT cellular network. The first BS maintains registration for the MD in the first coverage area and first RAT cellular network, although the MD is to communicate using carriers of the second cell.

At 158, a BS ISR module (e.g., the BS ISR module 68) of the second BS activates ISR in response to registration of the MD in the second RAT cellular network. The BS ISR module transmits a message to the MD indicating the ISR is activated.

At 160, a BS timing module (e.g., the BS timing module 76) determines and/or selects update periods for the first coverage area and the second coverage area. The update periods may be of different lengths. This allows the BS timing module to control and update timer values of BS timers (e.g., BS timers 94-100) and MD timers (e.g., MD timers 132, 134). The update periods are transmitted to the MD to set the MD timers. The BS timing module may also send an activation time to indicate when to start the MD timers. As an alternative, the MD may send a message to the second BS indicting when the MD timers are to be activated.

At 161, the BSs and the MD activate the BS timers (e.g., the BS timers 94-100) and the MD timers (e.g., 132, 134). The BS timers may be synchronized with respective ones of the MD timers, to be activated at a same time.

At 164, if either one of the first MD timer or the second MD timer is expired, task 166 is performed, otherwise task 122 is performed. At 166, the update module transmits a periodic TAU and/or periodic RAU to the second BS. A periodic TAU and periodic RAU refer to a TAU and RAU that are transmitted due to expiration of either one of the first MD timer or the second MD timer. The MD may send the TAU or the RAU depending on a current camp-on cell and/or associated expired timer. As a result, the MD may send a TAU when the MD timer associated with the TA or the RA expires. The MD may send a RAU when the MD timer associated with the TA or the RA expires. If the MD is in the TA, the MD sends the TAU. If the MD is in the RA, the MD sends the RAU. If the MD is in the TA and the RA, the MD may send both a TAU and a RAU. The TAU and the RAU are transmitted based on whichever one of the MD timers is shorter and expires first.

At 168, the BS timing module of the second BS determines whether the periodic TAU and/or periodic RAU is received. Task 170 is performed when the periodic TAU and/or periodic RAU are not received, otherwise task 172 is performed.

At 170, the second BS may detach the MD due to lack of a TAU and/or a RAU being received for an extended period (e.g., corresponding update period). This may include deregistration of the MD at the second BS. This may also include the second BS signaling the first BS and/or a backbone network to detach and deregister the MD.

At 172, the first BS, the second BS, and the MD reset the BS timers (e.g., the BS timers 94-100) and the MD timers (e.g., the MD timers 132, 134). This causes the BS timers to be reset regardless of which ones of the BS timers expire. The MD timers are also reset regardless of which one of the MD timers expire. At 174, the second BS may share the received TAU and/or RAU with the first BS and/or backbone network. At 176, registration modules of the BSs maintain registration of the MD in the cells and multi-RAT cellular networks. The method may end at 178.

Tasks 142, 148 or 161 may be performed after task 152, 170 or 176. Task 142 may be performed when the mobile device has, for example, been detached. Task 148 may be performed when detecting another BS and/or performing another handover. Task 151 may be performed when restarting the BS timers and the MD timers.

FIG. 4 shows a method of performing ISR with offset timers. Although the following tasks are primarily described with respect to the implementations of FIGS. 1-2, the tasks may be easily modified to apply to other implementations of the present disclosure. The tasks may be iteratively performed. The method may begin at 200.

At 202, a first BS may broadcast messages. The broadcast messages may be paging messages. At 204, a MD (e.g., the MD 26) monitors a carrier of the first BS and detects the broadcast messages and responds to the first BS. At 206, a registration module (e.g., the registration module 62) of the first BS registers the MD in a first coverage area, first cell and first RAT cellular network. The first coverage area may be a TA or a RA. The first RAT cellular network may be associated with 2G, 3G, and/or 4G LTE communication.

At 208, the MD detects broadcast messages of a second BS. The second BS may be in a second coverage area, a second cell, and a second RAT cellular network. The second coverage area may be a TA or a RA and may be different than the first coverage area. The second RAT cellular network may be associated with 2G, 3G, and/or 4G LTE communication and be different than the first RAT cellular network.

At 210, a cell deterioration module (e.g., the cell deterioration module 118) of the MD determines whether to perform a handover, as described above. The handover may be from the first coverage area, the first BS and the first RAT cellular network to the second coverage area, the second BS and the second RAT cellular network. If no handover is to be performed, the method may end at 212, otherwise task 214 may be performed. In one implementation, task 218 is performed instead of ending at 212. Task 218 may be performed subsequent to task 206.

At 214, the cell deterioration module and/or a MD control module of the MD may perform the handover and send an event-triggered TAU and/or RAU to the first BS and/or second BS. The handover may be referred to as an inter-RAT handover, as the handover is between different RAT cellular networks. The handover may be a first handover since the MD was initially registered in the first RAT cellular network.

At 216, a registration module of the second BS registers the MD in the second coverage area and second RAT cellular network. The first BS maintains registration for the MD in the first coverage area and first RAT cellular network, although the MD is to communicate using carriers of the second cell.

At 218, a BS ISR module (e.g., the BS ISR module 68) of the second BS activates ISR in response to registration of the MD in the second RAT cellular network. The BS ISR module transmits a message to the MD indicating the ISR is activated.

At 220, a BS timing module (e.g., the BS timing module 76) determines and/or selects update periods for the first coverage area and the second coverage area. The update periods may have the same length. The update periods are transmitted to the MD to set the MD timers (e.g., the MD timers 132, 134). The BS timing module may also send an activation time to indicate when to start the MD timers. As an alternative, the MD may send a message to the second BS indicting when the MD timers are to be activated.

At 222, an offset module (e.g., the offset module 104) of the second BS transmits an offset period to the MD. The offset period indicates an amount of time to delay before activating the second MD timer. The second MD timer may be activated subsequent to the activation of the first MD timer and subsequent to and/or at an end of the offset period. The offset period may begin subsequent to and/or when the first MD timer is activated. The second BS timers (e.g., the second BS timers 98, 100) may be activated the offset period after activation of the first BS timers (e.g., the first BS timers 94, 96).

The offset period is used to alternate in time when the MD timers expire, are reset, and/or are reactivated. As an example, alternating between MD timer expirations causes the MD to alternate or interleave transmissions of TAUs and RAUs. As an example, the offset timer may be set such that a first one of the MD timers expires when a second one of the MD timers reaches half of an update period. In other words, the second one of the MD timers may expire half way through an update period of the first one of the MD timers. If the update periods of the MD timers are the same, offset of the second MD timer causes (i) alternating activation times of the MD timers, and (ii) alternating expiration times of the MD timers.

If ISR is ON (activated), the update period for the MD timers may be twice of an update period used when ISR is OFF (deactivated). In other words, the number of updates (TAU and RAU) transmitted for two update periods when ISR is ON is a same number of updates (TAU and RAU) transmitted for a single update period when ISR is OFF. As a result, half the number of updates are transmitted when ISR is ON versus when ISR is OFF. Also, time between TAU transmissions when ISR is ON may be twice the amount of time between TAU transmissions when ISR is OFF. Likewise, time between RAU transmissions when ISR is ON may be twice the amount of time between RAU transmissions when ISR is OFF.

At 223, the BSs and the MD activate the BS timers (e.g., the BS timers 94-100) and the MD timers (e.g., the MD timers 132, 134). Activation of the second BS timers (e.g., the BS timers 98, 100) and the second MD timer (e.g., the MD timer 134) may be delayed by the offset period after activating the first BS timers (e.g., the BS timers 94, 96) and the first MD timer (e.g., the MD timer 132). The first BS timers and the first MD timer may be synchronized to be activated at a same time. The second BS timers and the second MD timer may be synchronized to be activated at a same time.

At 226, if either one of the first MD timer or the second MD timer is expired, task 228 is performed, otherwise task 224 is performed. At 228, the update module transmits a periodic TAU and/or periodic RAU to the second BS based on which one of the MD timers has expired. A TAU is transmitted when a corresponding MD timer expires. A RAU is transmitted when a corresponding MD timer expires. The TAU and the RAU may each be transmitted from the MD to the second BS.

At 230, the BS timing module of the second BS determines whether the periodic TAU and/or periodic RAU are received. Task 232 is performed when the periodic TAU and/or periodic RAU are not received, otherwise task 234 is performed.

At 232, the second BS may detach the MD due to lack of TAU and/or RAU being received for an extended period (e.g., corresponding update period). This may include deregistration of the MD at the second BS. This may also include the second BS signaling the first BS and/or a backbone network to detach and deregister the MD.

At 234, the first BS, the second BS, and the MD reset the expired BS timers and the expired MD timer. At 236, the second BS may not share the received TAU and/or RAU with the first BS and/or backbone network. In one implementation, the second BS shares the received TAU and/or RAU with the first BS and/or backbone network. At 238, registration modules of the BSs maintain registration of the MD in the cells and multi-RAT cellular networks. The method may end at 240.

Tasks 202, 208 or 223 may be performed after task 212, 232 or 238. Task 202 may be performed when the mobile device has, for example, been detached. Task 208 may be performed when detecting another BS and/or performing another handover. Task 223 may be performed when restarting the expired BS timers and the expired MD timer.

FIG. 5 shows a method of performing idle mode signaling reduction for a single coverage area. Although the following tasks are primarily described with respect to the implementations of FIGS. 1-2, the tasks may be easily modified to apply to other implementations of the present disclosure. The tasks may be iteratively performed. The method may begin at 300.

At 302, a first BS may broadcast messages. The broadcast messages may be paging messages. The broadcast messages may include carriers for a TA and/or a RA. The TA and RA may be in a same coverage (or super) area. The MD communicates with the BSs in the SA on the carriers. As an example, the TA may be associated with a first cell and the RA may be associated with a second cell. Alternatively, the TA may be associated with the second cell and the RA may be associated with the first cell.

At 304, a MD (e.g., the MD 26) monitors a carrier of the first BS and detects the broadcast messages and responds to the first BS. If the broadcast messages are transmitted from a 4G cell and if the RA and the TA are in the same SA, system information blocks (SIBS) 6 and 7 of the broadcast messages may include carrier frequencies for 2G and/or 3 G communication associated with the second cell. If the RA is not in the SA, then the SIB of the broadcast messages would not include the carrier frequencies for 2G and/or 3 G communication associated with the second cell. At 306, a registration module (e.g., the registration module 62) of the first BS registers the MD in the SA, the first cell and first RAT cellular network. The first RAT cellular network may be associated with 2G, 3G, and/or 4G LTE communication.

At 308, the MD detects broadcast messages of a second BS. The second BS may be in the second cell of the SA and a second RAT cellular network. The second broadcast messages may be on the same or different carriers of the first broadcast messages sent from the first BS. The second RAT cellular network may be associated with 2G, 3G, and/or 4G LTE communication and be different than the first RAT cellular network.

At 310, a cell deterioration module (e.g., the cell deterioration module 118) of the MD determines whether to perform a handover between the BSs, as described above. The handover may be from the first cell, the first BS and/or the first RAT cellular network to the second cell, the second BS and/or the second RAT cellular network. If no handover is to be performed, the method may end at 312, otherwise task 314 may be performed. In one implementation, task 316 is performed instead of ending at 312. Task 316 may be performed subsequent to task 306.

At 314, the cell deterioration module and/or a MD control module of the MD may perform the handover. The handover may be referred to as an inter-RAT handover, as the handover is between different RAT cellular networks. The handover may be a first handover since the MD registered in the first RAT cellular network.

At 315, a registration module of the second BS registers the MD in the second cell and second RAT cellular network. The first BS may maintain registration for the MD in the first cell and first RAT cellular network, although the MD is to communicate using carriers of the second cell. Registration of the MD in the SA may be maintained at both of the BSs.

At 316, a BS ISR module (e.g., the BS ISR module 68) of the second BS may activate ISR in response to registration of the MD in the second RAT cellular network. The BS ISR module transmits a message to the MD indicating the ISR is activated.

At 318, a BS timing module (e.g., the BS timing module 76) of the second BS determines and/or selects an update period for the SA. The update period is transmitted to the MD to set the MD timer (e.g., the MD timer 132) associated with the SA. The BS timing module may also send an activation time to indicate when to start the MD timer. As an alternative, the MD may send a message to the second BS indicting when the MD timer is to be activated.

At 320, the BSs and the MD activate the first BS timers (e.g., the BS timers 94, 96) and the MD timer. The BS timers and the MD timer may be synchronized to be activated at a same time.

At 322, if the MD timer is expired, task 324 is performed, otherwise task 320 is performed. At 324, the update module transmits a periodic SAU to the second BS based on expiration of the MD timer. The SAU may be transmitted from the MD to the second BS.

At 326, the second BS timing module determines whether the periodic SAU is received. Task 328 is performed when the periodic SAU is not received, otherwise task 330 is performed.

At 330, the second BS may detach the MD due to lack of SAU being received for an extended period (e.g., corresponding update period). This may include deregistration of the MD at the second BS. This may also include the second BS signaling the first BS and/or a backbone network to detach and deregister the MD.

At 332, the first BS, the second BS, and the MD reset the expired BS timers (e.g., the first BS timers 94, 96) and expired MD timer (e.g., the MD timer 132). At 334, the second BS may share the received SAU with the first BS and/or backbone network. At 336, registration modules of the BSs maintain registration of the MD in the cells and multi-RAT cellular networks. The method may end at 336.

Tasks 302, 308 or 319 may be performed after task 312, 328 or 334. Task 302 may be performed when the mobile device has, for example, been detached. Task 308 may be performed when detecting another BS and/or performing another handover. Task 319 may be performed when restarting the expired BS timers and the expired MD timer.

The above-described techniques reduce signals transmitted during an idle mode of a mobile device, which decreases the amount of power consumed by the mobile device during the idle mode. Reduced number of transmitted signals also minimizes resources, such as bandwidth, used for transmitting the signals.

Although the terms first, second, third, etc. may be used herein to describe various modules, network devices, elements, signals, and/or components, these items should not be limited by these terms. These terms may be only used to distinguish one item from another item. Terms such as "first," "second," and other numerical terms when used herein do not imply a sequence or order unless clearly indicated by the context. Thus, a first item discussed below could be termed a second item without departing from the teachings of the example implementations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A method comprising:
  performing a handover for a mobile device between a first radio access technology network and a second radio access technology network, wherein the first radio access technology network has a tracking area, and wherein the second radio access technology network has a routing area;
  activating idle mode signaling reduction in the mobile device, wherein activating the idle mode signaling reduction in the mobile device including activating (i) a first timer for the first radio access technology network, and (ii) a second timer for the second radio access technology network;
  in response to either one of the first timer and the second timer expiring, sending a tracking area update or a routing area update to a first base station, wherein the first base station is in the first radio access technology network or the second radio access technology network; and
  subsequent to the first timer or the second timer expiring, resetting the first timer while the second timer maintains a set offset from the first timer,
  wherein the tracking area update indicates that the mobile device has performed a handover to the first radio access technology network, and
  wherein the routing area update indicates that the mobile device has performed a handover to the second radio access technology network.

2. The method of claim 1, wherein the offset between the first timer and the second timer is zero.

3. The method of claim 1, further comprising defining a predetermined length, wherein a length of the offset is half of the predetermined length.

4. The method of claim 1, further comprising defining a predetermined area, wherein the predetermined area includes the tracking area and the routing area.

5. The method of claim 4, wherein the mobile device communicates using (i) fourth generation long term evolution protocols while in the first radio access technology network, and (ii) second generation long term evolution protocols or third generation long term evolution protocols while in the second radio access technology network.

6. The method of claim 4, further comprising, subsequent to the first timer or the second timer expiring and subsequent to sending the tracking area update or the routing area update, resetting the first timer and the second timer independent of whether both of the first timer and the second timer expired.

7. The method of claim 1, further comprising:
  while in the first radio access technology network, communicating with the first base station on a first carrier of a first cell of the first radio access technology network; and
  while in the second radio access technology network, communicating with a second base station on a second carrier of a second cell of the second radio access technology network.

8. The method of claim 7, further comprising sending the tracking area update to the first base station while the mobile device is communicating on the first carrier of the first cell.

9. The method of claim 8, further comprising sending the routing area update to the second base station while the mobile device is communicating on the second carrier of the second cell.

10. The method of claim 7, further comprising sending the routing area update to the second base station while the mobile device is communicating on the second carrier of the second cell.

11. The method of claim 1, comprising:
  in response to the first timer expiring, sending a routing area update to the first base station; and
  in response to the second timer expiring, sending a tracking area update to the first base station.

12. The method of claim 1, comprising, subsequent to the second timer expiring, resetting the first timer while the second timer maintains a set offset from the first timer.

13. The method of claim 1, further comprising refraining from sending the tracking area update and the routing area update during the idle mode signaling reduction.

14. A method comprising:
  performing a handover for a mobile device between a first radio access technology network and a second radio access technology network, wherein the first radio access technology network has a tracking area, and wherein the second radio access technology network has a routing area;
  subsequent to performing the handover and prior to activating a first timer and a second timer, receiving a first update period and a second update period from a base station;
  determining whether the first timer has expired based on the first update period;
  determining whether the second timer has expired based on the second update period;
  activating idle mode signaling reduction in the mobile device, wherein activating the idle mode signaling reduction in the mobile device including activating (i) the first timer for the first radio access technology network, and (ii) the second timer for the second radio access technology network;
  in response to either one of the first timer and the second timer expiring, sending a tracking area update or a routing area update to the base station, wherein the base station is in the first radio access technology network or the second radio access technology network;

resetting the first timer while the second timer maintains a set offset from the first timer, wherein the tracking area update indicates that the mobile device has performed a handover to the first radio access technology network, and wherein the routing area update indicates that the mobile device has performed a handover to the second radio access technology network; and defining a predetermined area, wherein the predetermined area includes the tracking area and the routing area.

15. The method of claim 14, wherein the first update period is different in length than the second update period.

16. The method of claim 15, further comprising:
determining whether the first timer or the second timer has expired;
in response to one of the first timer and the second timer expiring, sending the tracking area update or the routing area update to the base station; and
subsequent to sending the tracking area update or the routing area update, resetting both of the first timer and the second timer.

17. The method of claim 16, wherein the first update period has a same length as the second update period.

18. The method of claim 17, further comprising:
determining whether the first timer or the second timer has expired; in response to one of the first timer and the second timer expiring, sending the tracking area update or the routing area update to the base station; and subsequent to sending the tracing area update or the routing area update, resetting the expired one of the first timer and the second timer, and refraining from resetting a non-expired one of the first timer and the second timer.

19. The method of claim 17, further comprising:
receiving an offset period from the base station for one of the first timer and the second timer; and
activating one of the first timer and the second timer the offset period after activation of the other one of the first timer and the second timer to interleave tracking area updates and routing area updates by the mobile device to the base station.

20. A method comprising:
receiving, at a first base station, a signal from a mobile device, wherein the signal indicates that the mobile device is performing a first handover between (i) a first radio access technology network having a tracking area, and (ii) a second radio access technology network having a routing area;
responsive to the signal from the mobile device indicating that the mobile device is performing the first handover, activating idle mode signaling reduction at the first base station, and
transmitting a signal to the mobile device indicating activation of idle mode signaling reduction; and
during the idle mode signaling reduction,
activating (i) a first timer for the first radio access technology network, and (ii) a second timer for the second radio access technology network,
transmitting from the first base station to the mobile device, (i) a first update period corresponding to the first timer, and (ii) a second update period corresponding to the second timer, and
receiving, from the mobile device at the first base station, (i) a tracking area update the second timer has expired, or (ii) a routing area update when the first timer has expired, wherein the first timer expires based on the first update period, and wherein the second timer expires based on the second update period.

21. The method of claim 20, further comprising resetting the first timer and the second timer at the first base station in response to receiving either one of the tracking area update and the routing area update.

22. The method of claim 21, further comprising, subsequent to resetting the first timer and the second timer and while the mobile device is registered in the second radio access technology network, maintaining registration of the mobile device at the first base station and in the first radio access technology network.

23. The method of claim 22, further comprising sharing the tracking area update or the routing area update with a second base station.

24. The method of claim 22, further comprising:
performing a second handover between the first radio access technology network and the second radio access technology network; and
while the mobile device is registered in the second radio access technology network, maintaining registration of the mobile device at the first base station subsequent to both the first handover and the second handover.

25. The method of claim 24, wherein:
the base station communicates with the mobile device while the mobile device is in the first radio access technology network; and
the base station does not communicate with the mobile device while the mobile device is in the second radio access technology network.

26. The method of claim 24, further comprising, subsequent to either one of the first timer and the second timer expiring and while the mobile device is registered in the second radio access technology network, maintaining registration of the mobile device at the first base station and in the first radio access technology network.

27. The method of claim 20, further comprising, during the idle mode signaling reduction, maintaining registration of the mobile device in the first radio access technology network and the second radio access technology network.

28. A method comprising:
receiving, at a first base station, a signal from a mobile device, wherein the signal indicates that the mobile device is performing a first handover between (i) a first radio access technology network having a tracking area, and (ii) a second radio access technology network having a routing area;
responsive to the signal from the mobile device indicating that the mobile device is performing the first handover, activating idle mode signaling reduction at the first base station, and
transmitting a signal to the mobile device indicating activation of idle mode signaling reduction;
during the idle mode signaling reduction,
transmitting from the first base station to the mobile device, (i) a first update period for the first radio access technology network, and (ii) a second update period for the second radio access technology network, and
receiving, from the mobile device at the first base station, a tracking area update or a routing area update when either one of a first timer and a second timer have expired, wherein the first timer expires based on the first update period, and wherein the second timer expires based on the second update period;

determining an offset period for one of the first timer and the second timer;

activating one of the first timer and the second timer the offset period after activating the other one of the first timer and the second timer; and transmitting the offset period to the mobile device such that a third timer of the mobile device is activated the offset period after a fourth timer of the mobile device.

29. The method of claim 28, wherein:

the first timer is synchronized with one of the third timer and the fourth timer; and the second timer is synchronized with the other one of the third timer and the fourth timer.

30. The method of claim 28, further comprising refraining from sharing the tracking area update and the routing area update with a second base station.

* * * * *